(12) United States Patent
Tomescu

(10) Patent No.: US 11,554,850 B2
(45) Date of Patent: Jan. 17, 2023

(54) BLADE ANGLE POSITION FEEDBACK SYSTEM WITH OFFSET SENSORS

(71) Applicant: PRATT & WHITNEY CANADA CORP., Longueuil (CA)

(72) Inventor: Dana Tomescu, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 511 days.

(21) Appl. No.: 16/702,813

(22) Filed: Dec. 4, 2019

(65) Prior Publication Data

US 2020/0339244 A1    Oct. 29, 2020

Related U.S. Application Data

(60) Provisional application No. 62/838,378, filed on Apr. 25, 2019.

(51) Int. Cl.
*B64C 11/30* (2006.01)
*B64D 31/00* (2006.01)
*G01B 7/30* (2006.01)

(52) U.S. Cl.
CPC .......... *B64C 11/303* (2013.01); *B64C 11/301* (2013.01); *B64D 31/00* (2013.01); *G01B 7/30* (2013.01)

(58) Field of Classification Search
None
See application file for complete search history.

(56) References Cited

U.S. PATENT DOCUMENTS

| | | | |
|---|---|---|---|
| 4,934,901 A | 6/1990 | Duchesneau | |
| 5,186,608 A * | 2/1993 | Bagge | B64C 11/38 |
| | | | 416/37 |
| 5,897,293 A | 4/1999 | Arel et al. | |
| 5,913,659 A | 6/1999 | Doolin et al. | |
| 6,077,040 A | 6/2000 | Pruden et al. | |
| 8,687,206 B2 | 4/2014 | Hockaday | |
| 9,212,934 B2 | 12/2015 | Riedmueller et al. | |

(Continued)

FOREIGN PATENT DOCUMENTS

| | | |
|---|---|---|
| CA | 2976500 | 2/2018 |
| EP | 0353076 | 1/1990 |

*Primary Examiner* — Jas Sanghera
(74) *Attorney, Agent, or Firm* — Norton Rose Fulbright Canada LLP

(57) ABSTRACT

A blade angle feedback assembly for an aircraft-bladed rotor, the rotor rotatable about a longitudinal axis and having an adjustable blade pitch angle, is provided. The assembly comprises a feedback device coupled to rotate with the rotor and to move along the longitudinal axis with adjustment of the blade pitch angle, the feedback device comprising a plurality of position markers circumferentially spaced around the feedback device, a plurality of sensors positioned adjacent the feedback device and each configured for producing a sensor signal in response to detecting passage of the position markers as the feedback device rotates about the longitudinal axis, the sensors circumferentially spaced around the feedback device and axially offset along the longitudinal axis, and a control unit communicatively coupled to the sensors and configured to generate a feedback signal indicative of the blade pitch angle in response to the sensor signals received from the sensors.

18 Claims, 10 Drawing Sheets

(56) References Cited

U.S. PATENT DOCUMENTS

| | | |
|---|---|---|
| 9,821,901 B2 | 11/2017 | Duke et al. |
| 10,054,133 B2 | 8/2018 | Julienne et al. |
| 2014/0007591 A1 | 1/2014 | Khibnik et al. |
| 2017/0115320 A1 | 4/2017 | Turner |
| 2018/0050816 A1 | 2/2018 | Yakobov et al. |
| 2018/0304991 A1 | 10/2018 | Kudrna et al. |
| 2018/0306053 A1* | 10/2018 | Chapman ................ G01P 3/481 |

* cited by examiner

BLADE ANGLE POSITION FEEDBACK SYSTEM WITH OFFSET SENSORS

CROSS REFERENCE TO RELATED APPLICATIONS

This patent application claims priority of U.S. provisional Application Ser. No. 62/838,378, filed on Apr. 25, 2019, the entire contents of which are hereby incorporated by reference.

TECHNICAL FIELD

The present disclosure relates generally to engines, and more specifically to blade angle position feedback systems.

BACKGROUND OF THE ART

On featherable aircraft propeller systems, it is desirable to accurately measure the propeller blade pitch (or beta) angle to ensure that the blade angle is controlled according to the engine power set-point requested, such as in reverse and low pitch situations, also known as the beta operating region. For this purpose, some propeller feedback systems use a beta or feedback device, sometimes referred to as a phonic wheel, which rotates with the engine. The feedback device has multiple readable raised markers disposed on an outer surface thereof, and a sensor can be used to measure the rotation of the feedback device via the markers, providing a proxy value for the rotational velocity of the engine, as well as measure blade angle. Existing feedback devices are however vulnerable to a so-called "edge-effect" that leads to an increase in reading error as the sensor approaches the edges of the feedback device.

Therefore, improvements are needed.

SUMMARY

In accordance with a broad aspect, there is provided a blade angle feedback assembly for an aircraft-bladed rotor, the rotor rotatable about a longitudinal axis and having an adjustable blade pitch angle, the assembly comprising a feedback device coupled to rotate with the rotor and to move along the longitudinal axis with adjustment of the blade pitch angle, the feedback device comprising a plurality of position markers circumferentially spaced around the feedback device, a plurality of sensors positioned adjacent the feedback device and each configured for producing a sensor signal in response to detecting passage of the plurality of position markers as the feedback device rotates about the longitudinal axis, the plurality of sensors circumferentially spaced around the feedback device and axially offset along the longitudinal axis, and a control unit communicatively coupled to the plurality of sensors and configured to generate a feedback signal indicative of the blade pitch angle in response to the sensor signals received from the plurality of sensors.

In some embodiments, the feedback device comprises a root surface having a first edge and a second edge opposite the first edge, the plurality of position markers extending away from the root surface, and the plurality of sensors comprises a first sensor positioned adjacent the first edge and at least one second sensor positioned adjacent the second edge.

In some embodiments, the first sensor comprises a first permanent magnet and at least one first coil wound around the first permanent magnet and the at least one second sensor comprises a second permanent magnet and at least one second coil wound around the second permanent magnet.

In some embodiments, the control unit is further configured for receiving a plurality of sensor signals from the plurality of sensors as the feedback device is moved along the longitudinal axis, processing the plurality of sensor signals to generate a combined sensor signal having minimized reading error, and generating the feedback signal based on the combined sensor signal.

In some embodiments, processing the plurality of sensor signals comprises, at any given point in time, determining a given one of the plurality of sensor signals having minimized reading error, and a reading from the combined sensor signal at the given point in time is set to correspond to a reading from the given sensor signal at the given point in time.

In some embodiments, processing the plurality of sensor signals comprises processing a first sensor signal and a second sensor signal by setting the first sensor signal as a primary sensor signal, and, at a predetermined point in time during axial travel of the feedback device, setting the second sensor signal as the primary sensor signal. Before and after the predetermined point in time, a reading from the combined sensor signal is set to correspond to a reading from the primary sensor signal. At the predetermined point in time, a reading from the combined sensor signal is set to correspond to an average of readings from the first sensor signal and the second sensor signal.

In accordance with another broad aspect, there is provided an aircraft-bladed rotor system, comprising a rotor rotatable by a shaft about a longitudinal axis, the rotor having blades with adjustable blade pitch angle, a feedback device coupled to rotate with the rotor and to move along the longitudinal axis with adjustment of the blade pitch angle, the feedback device comprising a plurality of position markers circumferentially spaced around the feedback device, and a plurality of sensors positioned adjacent the feedback device and each configured for producing a sensor signal in response to detecting passage of the plurality of position markers as the feedback device rotates about the longitudinal axis, the plurality of sensors circumferentially spaced around the feedback device and axially offset along the longitudinal axis.

In some embodiments, the feedback device comprises a root surface having a first edge and a second edge opposite the first edge, the plurality of position markers extending away from the root surface, and the plurality of sensors comprises a first sensor positioned adjacent the first edge and at least one second sensor positioned adjacent the second edge.

In some embodiments, the first sensor comprises a first permanent magnet and at least one first coil wound around the first permanent magnet, and the at least one second sensor comprises a second permanent magnet and at least one second coil wound around the second permanent magnet.

In some embodiments, the rotor system further comprises a control unit communicatively coupled to the plurality of sensors and configured for receiving a plurality of sensor signals from the plurality of sensors as the feedback device is moved along the longitudinal axis, processing the plurality of sensor signals to generate a combined sensor signal having minimized reading error, and generating, based on the combined sensor signal, a feedback signal indicative of the blade pitch angle.

In some embodiments, the control unit is configured for processing the plurality of sensor signals comprising, at any given point in time, determining a given one of the plurality of sensor signals having minimized reading error, and a reading from the combined sensor signal at the given point in time is set to correspond to a reading from the given sensor signal at the given point in time.

In some embodiments, the control unit is configured for processing the plurality of sensor signals comprising processing a first sensor signal and a second sensor signal by setting the first sensor signal as a primary sensor signal, and, at a predetermined point in time during axial travel of the feedback device, setting the second sensor signal as the primary sensor signal. Before and after the predetermined point in time, a reading from the combined sensor signal is set to correspond to a reading from the primary sensor signal. At the predetermined point in time, a reading from the combined sensor signal is set to correspond to an average of readings from the first sensor signal and the second sensor signal.

In accordance with yet another broad aspect, there is provided a method for providing blade angle feedback for an aircraft-bladed rotor, the method comprising receiving a plurality of sensor signals from a plurality of sensors positioned adjacent a feedback device, the feedback device coupled to rotate with the rotor about a longitudinal axis and to move along the longitudinal axis with adjustment of a blade pitch angle of the rotor, the plurality of sensors circumferentially spaced around the feedback device and axially offset along the longitudinal axis, each sensor having associated therewith an optimal position range within which a reading error of the sensor is minimized, processing the plurality of sensor signals to generate a combined sensor signal having minimized reading error, and generating, based on the combined sensor signal, a feedback signal indicative of the blade pitch angle.

In some embodiments, processing the plurality of sensor signals comprises, at any given point in time, determining a given one of the plurality of sensor signals having minimized reading error, and a reading from the combined sensor signal at the given point in time is set to correspond to a reading from the given sensor signal at the given point in time.

In some embodiments, processing the plurality of sensor signals comprises processing a first sensor signal and a second sensor signal by setting the first sensor signal as a primary sensor signal, and at a predetermined point in time during axial travel of the feedback device, setting the second sensor signal as the primary sensor signal. Before and after the predetermined point in time, a reading from the combined sensor signal is set to correspond to a reading from the primary sensor signal. At the predetermined point in time, a reading from the combined sensor signal is set to correspond to an average of readings from the first sensor signal and the second sensor signal.

In some embodiments, the sensor signals are received from the plurality of sensors in response to detecting, as the feedback device rotates about the longitudinal axis, passage of a plurality of markers circumferentially spaced around the feedback device.

Features of the systems, devices, and methods described herein may be used in various combinations, in accordance with the embodiments described herein.

BRIEF DESCRIPTION OF THE DRAWINGS

Reference is now made to the accompanying figures in which.

It will be noted that throughout the appended drawings, like features are identified by like reference numerals.

DETAILED DESCRIPTION

Figure 1:
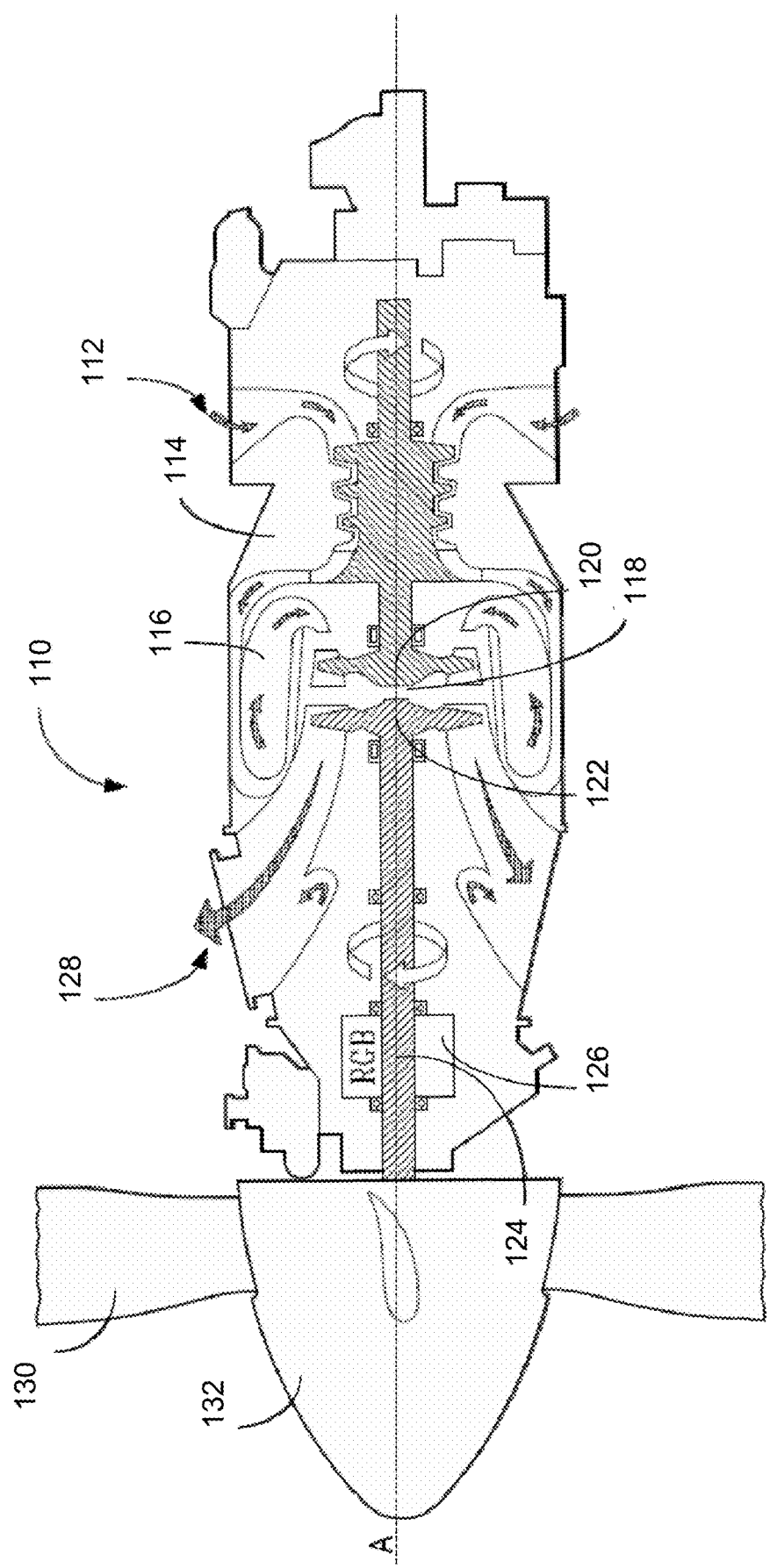
FIG. 1 is a schematic cross-sectional view of an example gas turbine engine.

FIG. 1 depicts a gas turbine engine 110 of a type typically provided for use in subsonic flight. The engine 110 comprises an inlet 112 through which ambient air is propelled, a compressor section 114 for pressurizing the air, a combustor 116 in which the compressed air is mixed with fuel and ignited for generating an annular stream of hot combustion gases, and a turbine section 118 for extracting energy from the combustion gases.

The turbine section 118 comprises a compressor turbine 120, which drives the compressor assembly and accessories, and at least one power or free turbine 122, which is independent from the compressor turbine 120 and rotatingly drives a rotor shaft (also referred to herein as a propeller shaft or an output shaft) 124 about a propeller shaft axis 'A' through a reduction gearbox (RGB) 126. Hot gases may then be evacuated through exhaust stubs 128. The gas generator of the engine 110 comprises the compressor section 114, the combustor 116, and the turbine section 118.

A rotor, in the form of a propeller 130 through which ambient air is propelled, is hosted in a propeller hub 132. The rotor may, for example, comprise the propeller 130 of a fixed-wing aircraft, or a main (or tail) rotor of a rotary-wing aircraft such as a helicopter. The propeller 130 may comprise a plurality of circumferentially-arranged blades connected to a hub by any suitable means and extending radially therefrom. The blades are also each rotatable about their own radial axes through a plurality of blade angles, which can be changed to achieve modes of operation, such as feather, full reverse, and forward thrust.

Figure 2:
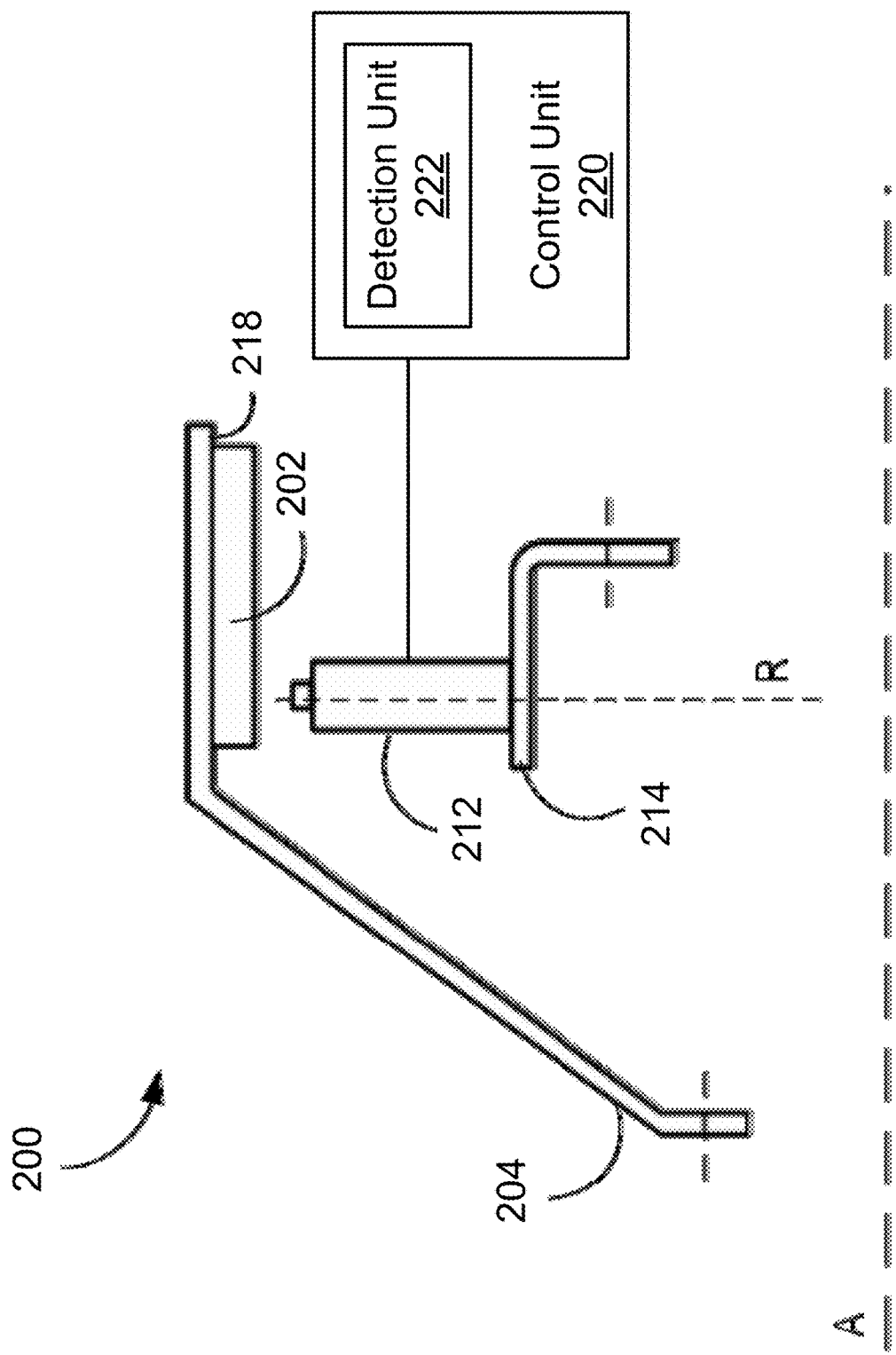
FIG. 2 is a schematic diagram of an example feedback sensing system.

With reference to FIG. 2, a feedback sensing system 200 for pitch-adjustable blades of bladed rotors of aircraft will now be described. The system 200 may be used for sensing a feedback device (also referred to as a feedback ring or phonic wheel) 204 of an aircraft propeller. It should however be understood that, although the system 200 is described and illustrated herein with reference to an aircraft propeller, such as the propeller 130 of FIG. 1, the system 200 may apply to other types of rotors, such as those of helicopters. The systems and methods described herein are therefore not limited to being used for aircraft propellers.

In some embodiments, the system 200 provides for detection and measurement of rotational velocity of one or more rotating elements of the engine 110 and of propeller blade angle on propeller systems, such as the propeller 130 of FIG. 1. The system 200 may interface to existing mechanical interfaces of typical propeller systems to provide a digital detection for electronic determination of the propeller blade angle. It should be noted that although the present disclosure focuses on the use of the system 200 and the feedback device 204 in gas-turbine engines, similar techniques can be applied to other types of engines, including, but not limited to, electric engines and hybrid electric propulsion systems having a propeller driven in a hybrid architecture (series, parallel, or series/parallel) or turboelectric architecture (turboelectric or partial turboelectric).

The system 200 comprises an annular member 204 and one or more sensors 212 positioned proximate the annular member 204. Annular member 204 (referred to herein as a feedback device) has a plurality of circumferentially-spaced apart and detectable features (also referred to as position markers or teeth) 202 disposed thereon for detection by sensor(s) 212. In some embodiments, the detectable features 202 and sensor(s) 212 may be disposed on a radially-outer side of feedback device 204. Alternatively, detectable features 202 and sensor(s) 212 could be disposed on a radially-inner side of feedback device 204. Several detectable features 202 may be spaced equiangularly about the perimeter (also referred to herein as the 'circumference') of the feedback device 204. Other embodiments may apply.

In one embodiment, the one or more sensors 212 are fixedly mounted to a static portion of the engine 110. In other embodiments, the one or more sensors 212 are mounted for rotation with propeller 130 and to move axially with adjustment of the blade angle of the blades of the propeller 130, and the feedback device 204 is fixedly mounted to a static portion of the engine 110.

In some embodiments, the feedback device 204 is mounted for rotation with propeller 130 and to move axially along rotation axis 'A' to a plurality of axial positions, with adjustment of the blade angle of the blades of the propeller 130. An axial position of the feedback device 204 may then correspond to a respective angular (pitch) position of the blades and the position markers 202 may be useful for detecting the axial position of the feedback device 204 as the feedback device 204 and bladed rotor 130 rotate. The feedback device 204 may therefore be useful for detecting the angular position of the adjustable blades by way of correlation.

The system 200 also includes a control unit 220 communicatively coupled to the one or more sensors 212. The sensor(s) 212 are configured for producing a sensor signal which is transmitted to or otherwise received by the control unit 220, for example via a detection unit 222 thereof. The sensor signal can be an electrical signal, digital or analog, or any other suitable type of signal. In some embodiments, the sensor(s) 212 produce a signal pulse in response to detecting the presence of a position marker 202 in a sensing zone of the sensor 212. For example, the sensor 212 is an inductive sensor that operates on detecting changes in magnetic flux, and has a sensing zone which encompasses a circular or rectangular area or volume in front of the sensor 212. When a position marker 202 is present in the sensing zone, or passes through the zone during rotation of the feedback device 204, the magnetic flux generated by the sensor(s) 212 in the sensing zone is varied by the presence of the position marker 202, and the sensor 212 can produce a signal pulse, which forms part of the sensor signal. Accordingly, the position markers 202 may be made of any suitable material (e.g., a ferromagnetic material, Mu-Metal, or the like) which would cause the passage of the position markers 202 near the sensor 212 to provide a change in magnetic permeability within the magnetic field generated by the sensor 212.

In the example illustrated in FIG. 2, a side view of a portion of feedback device 204 and sensor 212 is shown. The sensor 212 is mounted to a flange 214 of a housing of the reduction gearbox 126, so as to be positioned adjacent the plurality of position markers 202, which extend away from the feedback device 204 and towards the sensor 212. The sensor 212 may be mounted at any suitable angle relative to the position markers 202. In some embodiments, the sensor 212 is secured to the propeller 130 so as to extend away from the flange 214 and towards the position markers 202 along a radial direction, identified in FIG. 2 as direction 'R'. Sensor 212 and flange 214 may be fixedly mounted, for example to the housing of the reduction gearbox 126, or to any other static element of the engine 110, as appropriate.

Figure 3:
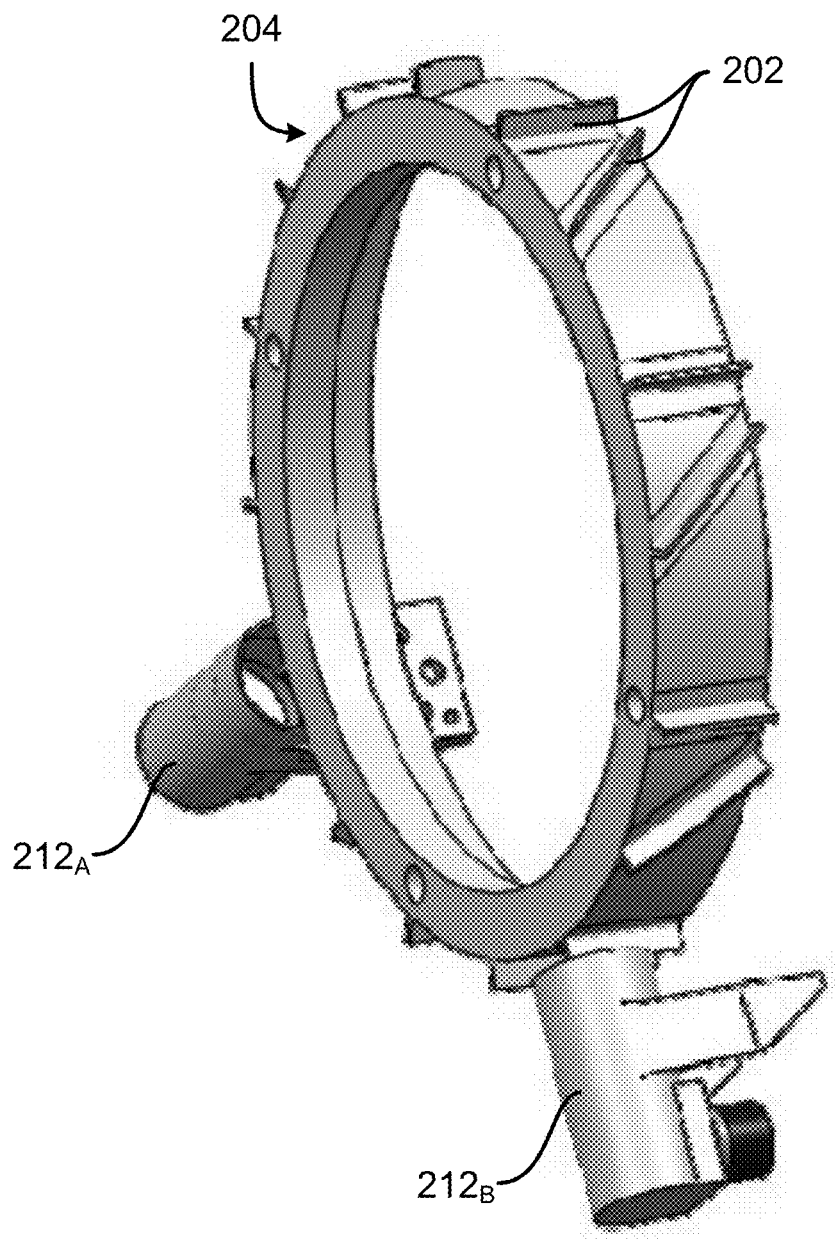
FIG. 3 is a perspective view of the feedback device of FIG. 2 with multiple sensors mounted adjacent to the feedback device, in accordance with one embodiment.

In some embodiments, a single sensor 212 is mounted in close proximity to the feedback device 204 and the position markers 202. In some other embodiments, in order to provide redundancy as well as multiple signal sources at different axial locations, one or more additional sensors, which may be similar to the sensor 212, are provided. In particular, it may be desirable to use multiple sensors when the axial distance (i.e. the distance along axis A) travelled by the feedback device 204 is too large for the range of the sensors as in 212. It should be understood that any suitable number of sensors may apply and the number of sensors 212 and their positions may be optimized according to the specifics of the application. The plurality of sensors are illustratively radially offset around the circumference of the feedback device 204. For example and as illustrated in FIG. 3, a first sensor $212_A$ may be mounted at a first angular location around the circumference of the feedback device 204 and an additional sensor $212_B$ may be mounted at another angular location. In the embodiment of FIG. 3, the sensor $212_A$ is mounted at a so-called 4 o'clock position while the sensor $212_B$ is mounted at a so-called 8 o'clock position. In another embodiment, the sensor $212_B$ may be mounted in a diametrically opposite relationship to the sensor $212_A$. It should however be understood that the angular locations of the plurality of sensors $212_A$, $212_B$ may vary depending on engine configuration. As will be discussed further below, the plurality of sensors (as in $212_A$, $212_B$) are also axially offset from one another along the direction of axial travel of the feedback device 204.

Figure 4:
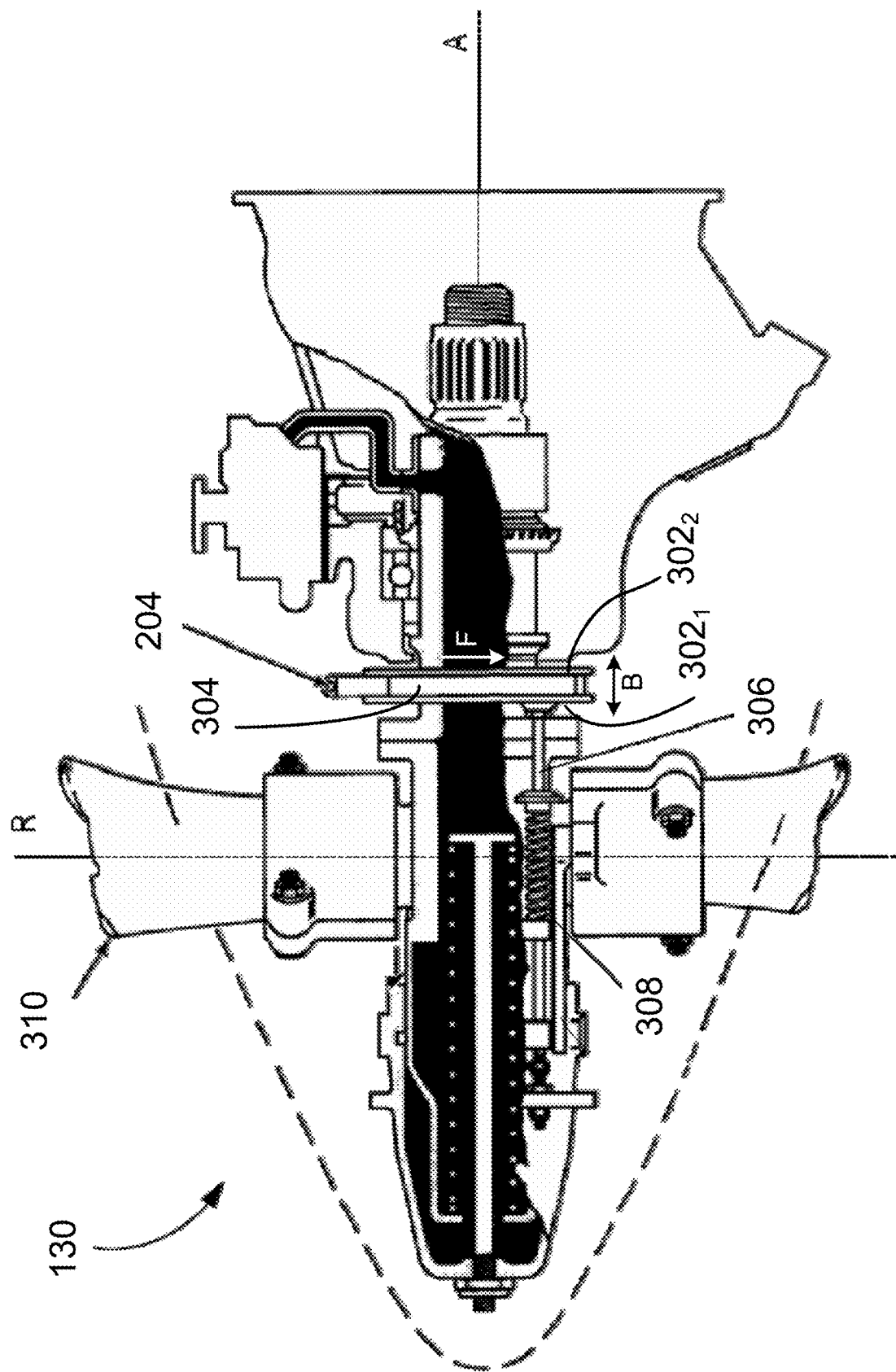
FIG. 4 is a schematic diagram of the propeller of FIG. 1 with the feedback device of FIGS. 2 and 3, in accordance with one embodiment.

With additional reference to FIG. 4, in some embodiments the feedback device 204 is embodied as a circular disk which rotates as part of the engine 110, for example with the propeller shaft 124 or with the propeller 130. The feedback device 204 comprises opposing faces (not shown) having outer edges $302_1$, $302_2$ and defines a root surface 304 which extends between the opposing faces and circumscribes them. Put differently, the root surface 304 of the feedback device 204 is the outer periphery of the circular disk which spans between the two opposing faces and the root surface 304 intersects the faces at the edges $302_1$, $302_2$. In these embodiments, the position markers 202 can take the form of projections which extend from the root surface 304.

The position markers 202 may comprise a plurality of first projections (not shown) arranged along a direction substantially transverse to the opposing faces and substantially equally spaced from one another on the root surface 304. The position markers 202 may also comprise one or more second projections (not shown) each positioned between two adjacent first projections. Each second projection is illustratively oriented along a direction, which is at an angle relative to the direction along which the first projections are arranged. The angle can be any suitable value between 1° and 89°, for example 30°, 45°, 60°, or any other value, as appropriate. It should be noted, however, that in some other embodiments the second projection(s) can be co-oriented with the first projections. It should also be noted that in some embodiments, each second projection can be substituted for a groove or inward projection, as appropriate. In addition, in some embodiments, the feedback device 204 includes only a single second projection while, in other embodiments, the feedback device 204 can include more than one second projection. In the latter case, the second projections can be oriented along a common orientation or along one or more different orientations and each second projection can be located at substantially a midpoint between two adjacent first projections or can be located close to a particular one of two adjacent first projections. Other embodiments may apply.

In one embodiment, the position markers 202 are integrally formed with the feedback device 204 so that the feedback device 204 may have a unitary construction. In another embodiment, the position markers 202 are manufactured separately from the feedback device 204 and attached thereto using any suitable technique, such as welding or the like.

It should also be noted that, although the present disclosure focuses primarily on embodiments in which the position markers 202 are projections, other embodiments are also considered. The position markers 202 may, for example, comprise one or more of protrusions, teeth, walls, voids, recesses, and/or other singularities. For instance, in some embodiments, the position markers 202 may be embedded in the circular disk portion of the feedback device 204, such that the feedback device 204 has a substantially smooth or uniform root surface 304. A position marker 202 can then be a portion of the feedback device 204 which is made of a different material, or to which is applied a layer of a different material. The position markers 202 may then be applied to the root surface 304, for instance as strips of metal or other material for detection by the sensor 212, which can be an inductive sensor capable of sensing changes in magnetic flux (as discussed above) or any other suitable sensor such as a Hall sensor or a variable reluctance sensor. Still other embodiments are considered.

The signal pulses produced by the sensor 212, which form part of the electrical signal received by the control unit 220, can be used to determine various operating parameters of the engine 110 and the propeller 130. The spacing of the first projections (which may, or may not, be regular) can, for example, be used to determine a speed of rotation of the feedback device 204. In addition, the second projection(s) can be detected by the sensor 212 to determine a blade angle of the propeller 130.

With continued additional reference to FIG. 4, the feedback device 204 is supported for rotation with the propeller 130, which rotates about the longitudinal axis 'A'. The feedback device 204 is also supported for longitudinal sliding movement along the axis A, e.g. by support members, such as a series of circumferentially spaced feedback rods 306 that extend along the axis A. A compression spring 308 surrounds an end portion of each rod 306.

As depicted in FIG. 4, the propeller 130 comprises a plurality of angularly arranged blades 310, each of which is rotatable about a radially-extending axis 'R' through a plurality of adjustable blade angles, the blade angle being the angle between the chord line (i.e. a line drawn between the leading and trailing edges of the blade) of the propeller blade section and a plane perpendicular to the axis of propeller rotation. In some embodiments, the propeller 130 is a reversing propeller, capable of operating in a variety of modes of operation, including feather, full reverse, and forward thrust. Depending on the mode of operation, the blade angle may be positive or negative: the feather and forward thrust modes are associated with positive blade angles, and the full (or maximum) reverse mode is associated with negative blade angles.

With continued reference to FIG. 2, FIG. 3, and FIG. 4, as the feedback device 204 rotates, varying portions thereof enter, pass through, and then exit the sensing zone of the one or more sensors 212. From the perspective of the sensor(s) 212, the feedback device 204 moves axially along axis A (in the direction of arrow B in FIG. 4) and rotates about direction 'F' (shown in FIG. 4). With axial travel of the feedback device 204, the one or more sensors 212 are therefore positioned adjacent to different portions of the feedback device 204. In particular, a given sensor 212 is adjacent the edge $302_2$ (also referred to as the 'engine side') when the propeller (reference 130 in FIG. 1) is in a primary blade angle position. When the propeller 130 is in the maximum reverse condition, the sensor 212 is adjacent the edge $302_1$ (also referred to as the 'propeller side'). The longitudinal (or beta) position (along axis A) of the feedback device 204 relative to the sensor 212 therefore varies with movement of the feedback ring 204. However, as the sensor 212 is positioned adjacent to the edges $302_1$, $302_2$ with movement of the feedback ring 204, a drop in magnetic flux occurs. This results in a so-called "edge-effect" that leads to an increase in reading error (also referred to herein as beta error) at the edges $302_1$, $302_2$, particularly as the feedback device 204 moves away from the sensor 212.

Figure 5:
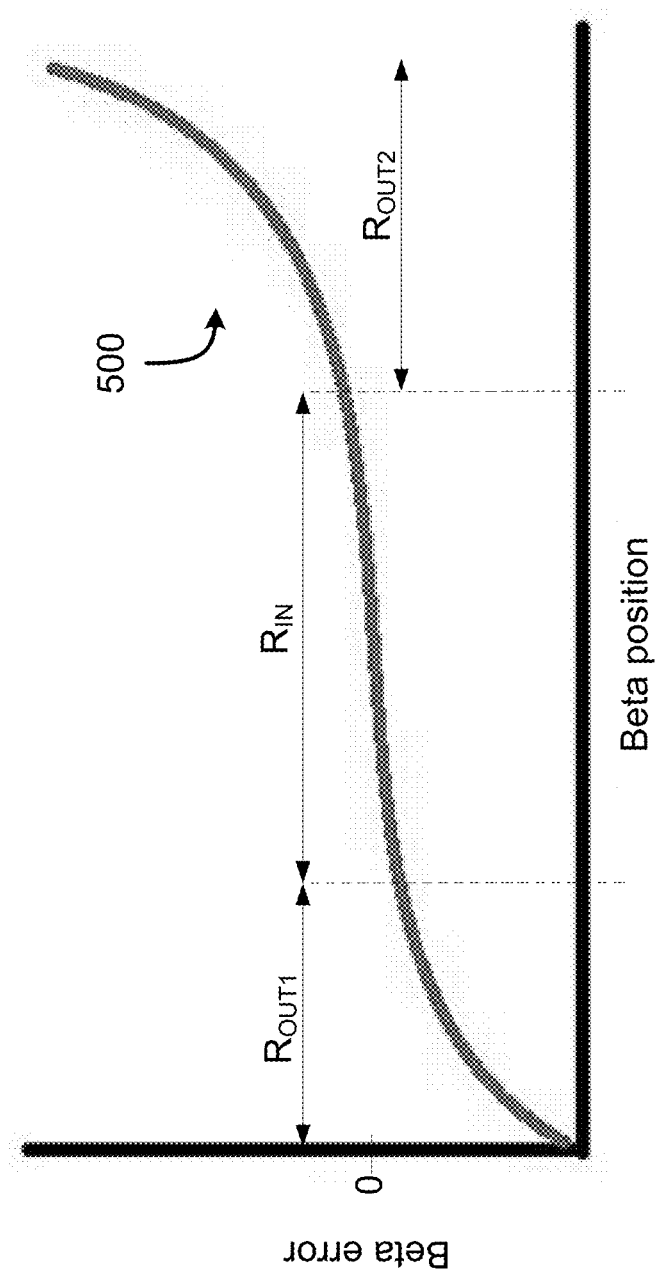
FIG. 5 is a plot of beta error as a function of beta position, in accordance with one embodiment.

FIG. 5 shows a plot 500 of the beta error as a function of the beta position of a given sensor 212 relative to the feedback device 204. The plot 500 illustrates the above-referenced edge-effect and shows the beta error when the sensor 212 is not within accurate reading range of a given edge $302_1$, $302_2$ of the feedback device 204. From the plot 500, it can indeed be seen that the reading obtained from sensor 212 is the most accurate (i.e. the beta error is the lowest and substantially linear) within a given beta position range $R_{IN}$ (also referred to herein as an 'optimal position range'). In one embodiment, the beta error is substantially equal to zero when it is lowest, i.e. within beta position range $R_{IN}$. As the feedback device 204 is moving further away from the sensor 212 (e.g., outside the range $R_{IN}$ such that the beta position is within a range $R_{OUT1}$ or $R_{OUT2}$), the beta error increases and reaches a maximum when the sensor 212 is positioned close to the edges $302_1$, $302_2$ of the feedback device 204. In other words, the sensor reading becomes increasingly inaccurate beyond the range $R_{IN}$. A sensor measurement obtained within the beta position range $R_{IN}$ may then be referred to as 'in-range' (i.e., within reading accuracy range) while a sensor measurement obtained within beta position range $R_{OUT1}$ or $R_{OUT2}$ may then be referred to as 'out-of-range' (i.e., out of reading accuracy range). In the embodiment illustrated in FIG. 5, the sensor 212 is positioned along a centerline (not shown) of the feedback device 204. As a result, the sensor measurement is inaccurate within two beta position ranges $R_{OUT1}$ and $R_{OUT2}$.

In order to permit the one or more sensors 212 to accurately detect the passage of the position markers 202 without any edge-related effects, it is proposed herein to axially offset the one or more sensors 212 along the direction of axial travel of the feedback device 204 (i.e., along the longitudinal axis A, in the direction of arrow B in FIG. 4), as will be discussed further below. In this manner, detection of the position markers 202 at multiple axial positions is allowed. Each sensor 212 is positioned in a given axial plane at which maximum magnetic flux is detected (i.e. when the feedback device 204 is positioned adjacent the sensor 212). A sensor signal is then output by each sensor 212 and the multiple sensor signals are received at the detection unit (reference 222 in FIG. 2) where they are processed and combined using any suitable technique, as will also be discussed further below. In one embodiment, all sensors 212 are reading at all times and the sensors 212 may have an overlap in reading (e.g., for certification purposes). The sensors 212 are may be used for speed sensing and the overlap in reading may be used in case of a sensor failure. In one embodiment, at any given point in time, the reading from one of the sensors 212 (referred to herein as the 'primary' sensor) may be more accurate than the reading(s) from other sensor(s) 212. The sensor signal from the primary sensor (referred to herein as the 'primary sensor signal') may then be used at the given point in time to ultimately provide blade pitch angle feedback, as will be discussed further below.

Figure 6A:
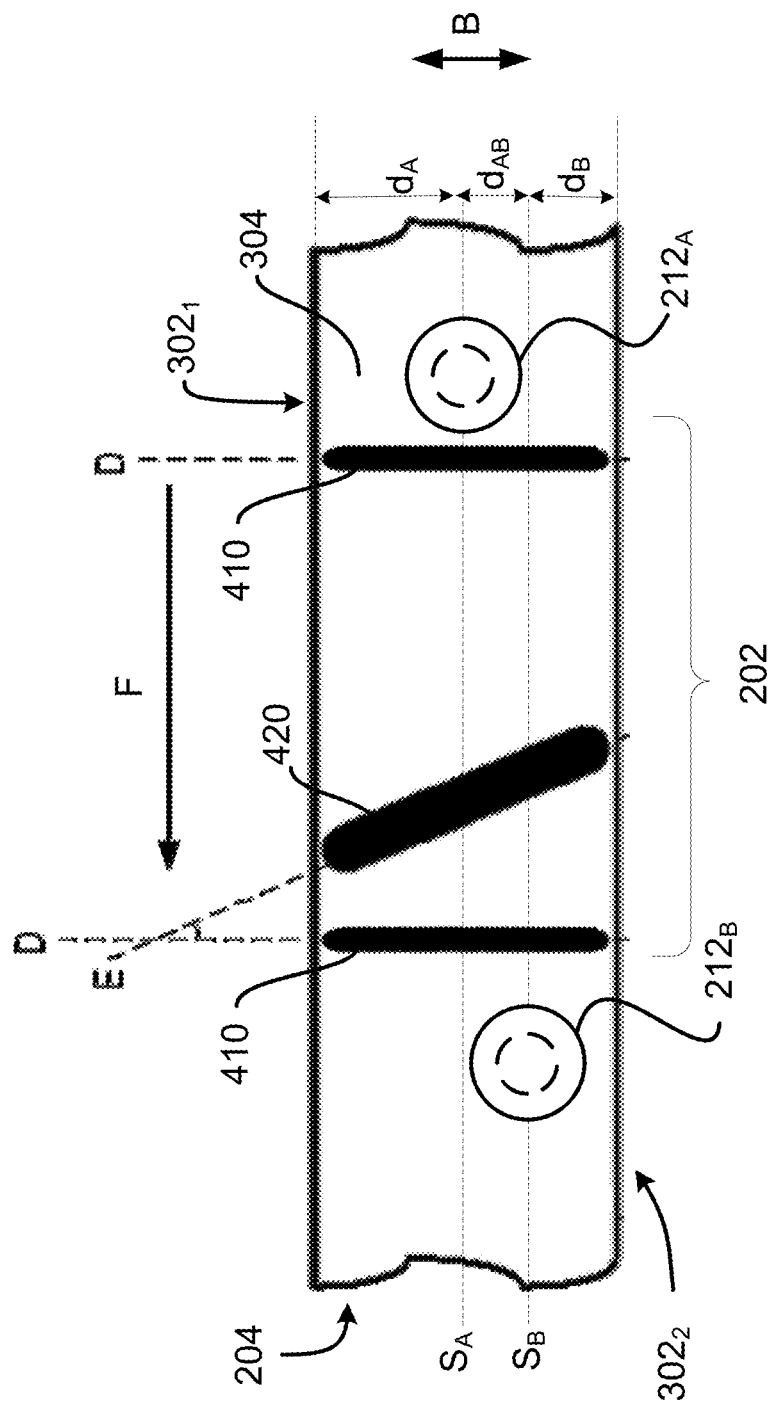
FIG. 6A is a schematic bottom view of the feedback device of FIGS. 2 and 3 showing two axially offset sensors, in accordance with one embodiment.

Referring now to FIG. 6A, the feedback device 204 illustratively comprises position markers 202, which, in one embodiment, can take the form of projections which extend from the root surface 304. In one embodiment, the position markers 202 include a plurality of projections 410 which are arranged along a direction 'D', which is substantially transverse to the opposing edges $302_1$, $302_2$. Although only two projections 410 are illustrated, it should be understood that any suitable number of projections 410 may be present across the whole of the root surface 304. In one embodiment, the projections 410 may be substantially equally spaced from one another on the root surface 304. In addition, the projections 410 may, in some embodiments, be of substantially a common shape and size, for example having a common volumetric size. Still, other embodiments are considered.

The feedback device 204 also includes at least one supplementary projection 420 which is positioned between two adjacent ones of the projections 410. In the embodiment depicted in FIG. 6A, the projection 420 is oriented along a direction 'E', which is at an angle relative to direction 'D'. The angle between directions 'D' and 'E' can be any suitable value between 1° and 89°, for example 30°, 45°, 60°, or any other value, as appropriate. It should be noted, however, that in some other embodiments the supplementary projection 420 can be co-oriented with the projections 410, for instance along direction 'D'.

In some embodiments, the feedback device 204 includes only a single supplementary projection 420. In other embodiments, the feedback device 204 can include two, three, four, or more supplementary projections 420. In embodiments in which the feedback device 204 includes more than one supplementary projection 420, the supplementary projections can all be oriented along a common orientation, for instance direction 'E', or can be oriented along one or more different orientations. The projection 420 can be located at substantially a midpoint between two adjacent projections 410, or, as shown in FIG. 6A, can be located close to a particular one of two adjacent projections 410.

In the embodiment illustrated in FIG. 6A, two sensors $212_A$, $212_B$ are used as part of the feedback sensing system 200. The sensors $212_A$, $212_B$ have a generally cylindrical shape with a respective sensor axis $S_A$, $S_B$. The sensors $212_A$, $212_B$ are illustratively radially offset around the circumference of the feedback device 204. In addition, both sensors $212_A$, $212_B$ (and particularly the sensor axes $S_A$, $S_B$) are offset axially (i.e., along the longitudinal axis A of FIG. 4, in the direction of arrow B) from one another by a distance $d_{AB}$. For this purpose, a first one of the sensors (e.g. sensor $212_A$) is illustratively spaced from a first one of the edges (e.g., edge $302_1$) of the feedback device 204. In the illustrated embodiment, a distance $d_A$ is created between the edge $302_1$ and the sensor axis $S_A$. The other sensor (e.g., sensor $212_B$) is spaced from the other edge (e.g. edge $302_2$) of the feedback device 204. In the illustrated embodiment, a distance $d_B$ is created between the edge $302_2$ and the sensor axis $S_B$. In this manner, edge-related effects can be mitigated.

Figure 6B:
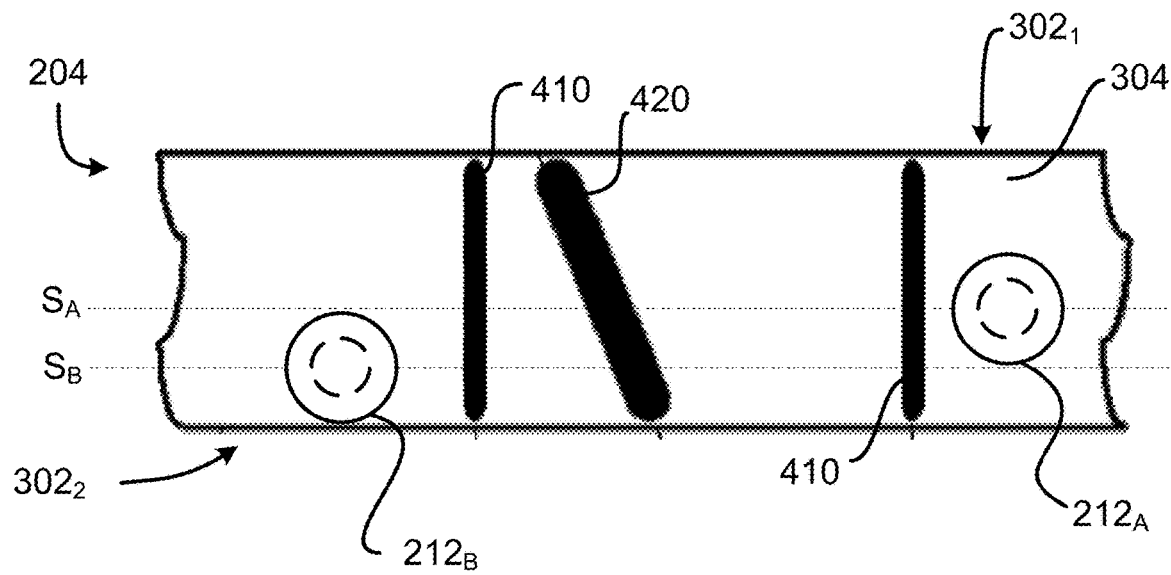
FIG. 6B is a schematic bottom view of the feedback device of FIGS. 2 and 3 showing two axially offset sensors when the propeller is in a primary blade angle position, in accordance with one embodiment.
Figure 6C:
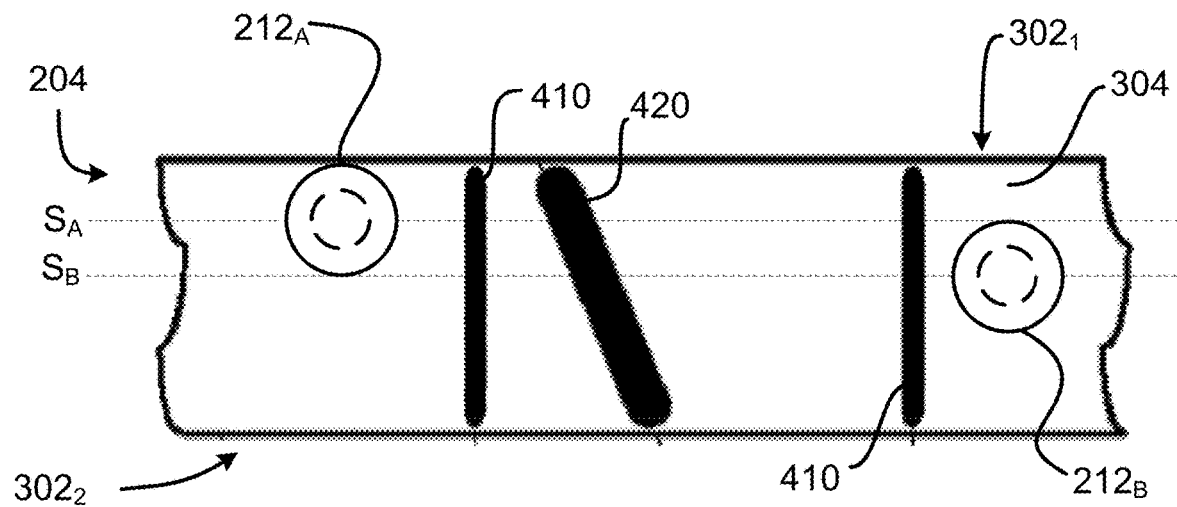
FIG. 6C is a schematic bottom view of the feedback device of FIGS. 2 and 3 showing two axially offset sensors when the propeller is in a maximum reverse position, in accordance with one embodiment.

The function (e.g., protection versus control sensor) of each sensor $212_A$, $212_B$ may determine the edge $302_1$, $302_2$ adjacent to which the sensor $212_A$, $212_B$ is positioned. In one embodiment, a first one of the sensors $212_A$, $212_B$ may be biased towards the primary blade angle (also referred to herein as 'fine pitch' or 'fine feather') position while the other one of the sensors $212_A$, $212_B$ is biased towards the maximum reverse position. As a result, the first sensor is illustratively positioned adjacent a first one of the feedback device edges $302_1$, $302_2$ while the other sensor is positioned adjacent the opposite one of the feedback device edges $302_1$, $302_2$. FIG. 6B illustrates the location of the sensors $212_A$, $212_B$ when the propeller (reference 130 in FIG. 1) is in a primary blade angle position, with sensor $212_B$ being positioned adjacent to edge $302_2$. FIG. 6C illustrates the location of the sensors $212_A$, $212_B$ when the propeller 130 is in a maximum reverse position, with sensor $212_A$ being positioned adjacent to edge $302_1$. It should however be understood that, in some embodiments, only one sensor $212_A$, $212_B$ (rather than both) may be biased towards a given propeller position (e.g., primary blade angle or maximum reverse).

The distances $d_A$, $d_B$, $d_{AB}$ may be determined based on a number of factors, including, but not limited to, amount of beta error, available space according to clearances and tolerance stack-up of the feedback sensing system 200, and accuracy required by the feedback sensing system 200. In one embodiment, the distances $d_A$, $d_B$ between the sensors $212_A$, $212_B$ and the feedback device edges $302_1$, $302_2$ are determined through simulation. In particular, the distances $d_A$, $d_B$ may be determined such that the sensors $212_A$, $212_B$ are positioned far enough from the edges $302_1$, $302_2$ that the beta error of the sensor signal is substantially linear and thus lowest (e.g., substantially equal to zero) such that the best (or in-range) measurement is provided. The sensors as in $212_A$, $212_B$ are thus illustratively positioned adjacent the edges $302_1$, $302_2$ at a distance selected to ensure that the beta error is lowest (e.g., substantially equal to zero) at either edge $302_1$, $302_2$. In one embodiment, the sensors $212_A$, $212_B$ are positioned relative to the edges $302_1$, $302_2$ such that the distance between the sensors $212_A$, $212_B$ (i.e. the axial offset) is about 0.100 inches. Other embodiments may apply.

Although two sensors $212_A$, $212_B$ are shown and described herein for sake of clarity, it should be understood that the number of sensors may vary. For example, three sensors may be used for redundancy purposes, with one sensor being used in case of failure of one of the other sensors. The number of sensors is illustratively selected such that enough sensors are positioned to cover the span of axial translation of the feedback device 204. When more than two sensors as in $212_A$, $212_B$ are used, the first two sensors $212_A$, $212_B$ are positioned at given distances $d_A$, $d_B$ from the feedback device edges $302_1$, $302_2$, as discussed above, and the remaining sensors are spaced from the first two sensors $212_A$, $212_B$ and from one another by a distance suitable to cover the full axial displacement of the feedback device 204. In other words, the number of sensors illustratively depends on the axial translation of the feedback device 204. It should also be understood that the various sensors may or may not be spaced equally from one another.

The sensors as in $212_A$, $212_B$ are illustratively positioned relative to the edges $302_1$, $302_2$ to ensure that no sensor is outside of the feedback device 204. In one embodiment, each sensor $212_A$ or $212_B$ may be positioned such that its sensor axis $S_A$ or $S_B$ is aligned with a given edge $302_1$ or $302_2$ of the feedback device 204. In this manner, a portion of the body of the sensor $212_A$ or $212_B$ is positioned beyond the edge $302_1$ or $302_2$. In another embodiment, each sensor $212_A$ or $212_B$ may be positioned relative to the given edge $302_1$ or $302_2$ such that the entire body of the sensor $212_A$ or $212_B$ remains within the feedback device 204 (i.e. does not extend beyond the edge $302_1$ or $302_2$).

Figure 7A:
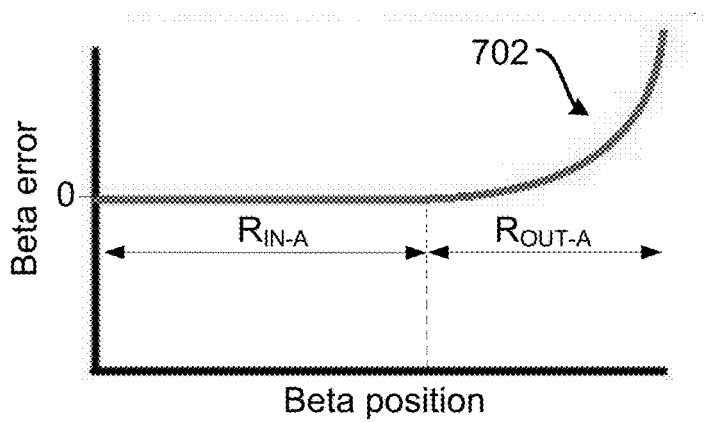
FIG. 7A is a plot of beta error as a function of beta position, for a signal received from one of the sensors of FIG. 6A, in accordance with one embodiment.
Figure 7B:
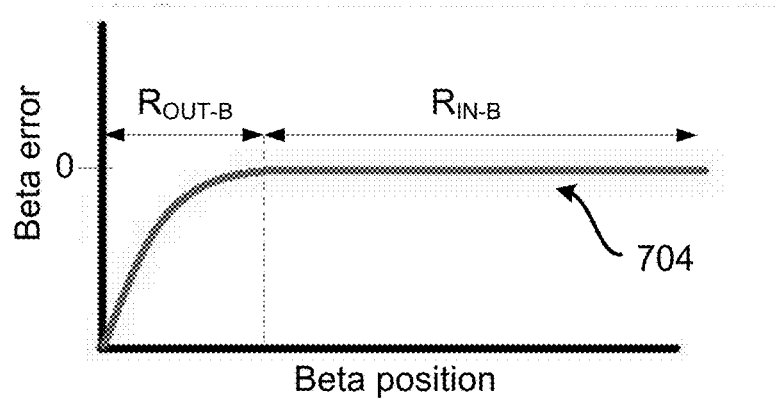
FIG. 7B is a plot of beta error as a function of beta position, for a signal received from the other sensor of FIG. 6A, in accordance with one embodiment.
Figure 7C:
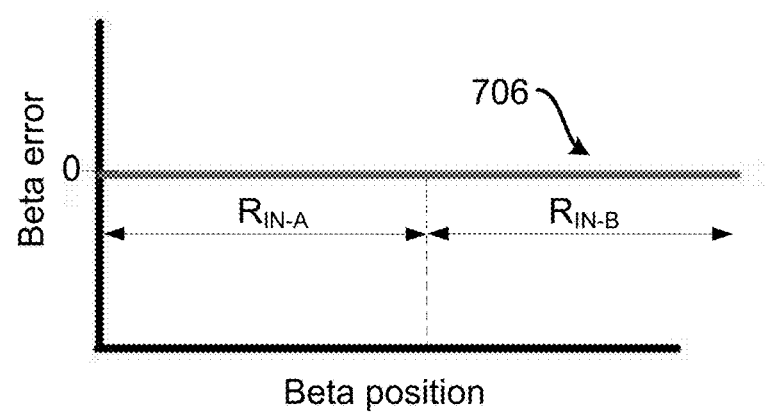
FIG. 7C is a plot of beta error as a function of beta position, for a combined sensor signal, in accordance with one embodiment.

FIG. 7A and FIG. 7B illustrate plots 702, 704 of the beta error as a function of the beta position of a first and a second sensor (e.g., sensor $212_A$ and sensor $212_B$) relative to the feedback device 204. In the embodiment illustrated in FIG. 7A, the sensor $212_A$ is biased towards the primary blade angle position and positioned adjacent to a given one of the edges $302_1$, $302_2$ of the feedback device 204. It can be seen from plot 702 that this results in the beta error being substantially linear (i.e. in the sensor measurement being in-range) over a beta position range $R_{IN-A}$ and in the beta error increasing (i.e. in the sensor measurement being out-of-range) over a beta position range $R_{OUT-A}$, as the sensor $212_A$ is moved away from the edge $302_1$ or $302_2$ adjacent to which is was initially positioned. Conversely, in the embodiment illustrated in FIG. 7B, the sensor $212_B$ is biased towards the maximum reverse position and positioned adjacent to the other one of the edges $302_1$, $302_2$ of the feedback device 204. It can be seen from plot 704 that this results in the beta error being substantially linear (i.e. in the sensor measurement being in-range) over a beta position range $R_{IN-B}$ and in the beta error increasing (i.e. in the sensor measurement being out-of-range) over a beta position range $R_{OUT-B}$. The signals obtained from sensors $212_A$, $212_B$ are then combined and FIG. 7C illustrates a plot 706 of the beta error as a function of beta position for the resulting combined sensor signal. In particular, the in-range measurements (i.e. obtained over beta position ranges $R_{IN-A}$ and $R_{IN-B}$) from both sensors $212_A$, $212_B$ are combined such that the resulting plot 706 is substantially linear over the entire beta position range, as will be discussed further below.

Figure 8:
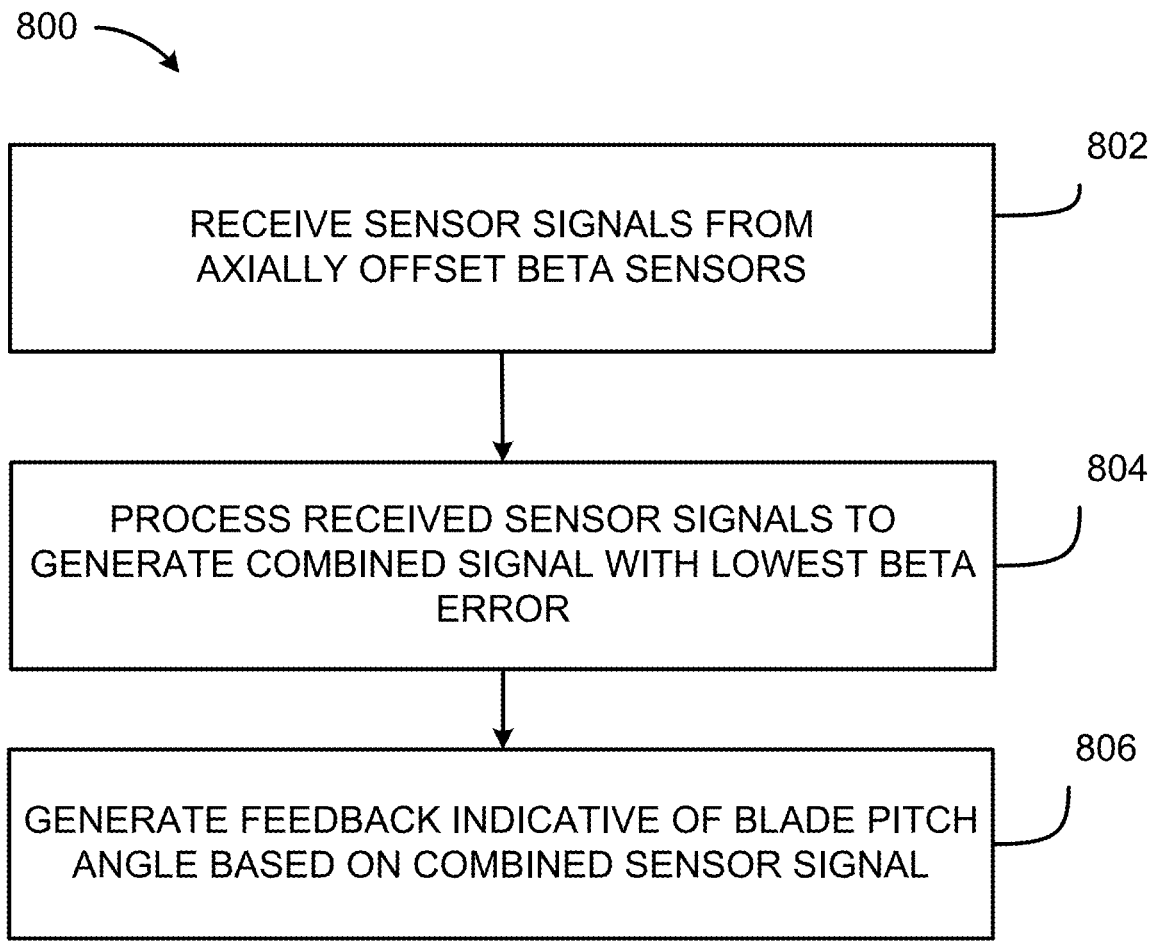
FIG. 8 is a flowchart illustrating an example method for blade angle position feedback detection, in accordance with an embodiment.

Referring now to FIG. 8, a method 800 for blade angle position feedback detection will now be described, in accordance with one embodiment. The method 700 is illustratively performed by the detecting unit (reference 222 in FIG. 2). The method 700 comprises receiving at step 702 (by the detection unit 222) a plurality of sensor signals from a plurality of axially offset beta sensors (e.g., $212_A$ and $212_B$ of FIG. 6A). As described herein above, the sensors are offset along a direction of axial travel of a feedback device.

At step 804, the sensor signals are processed to generate a combined sensor signal with the least beta error. As used herein, the term 'lowest' (or 'least') beta error refers to a beta error that is substantially linear (as illustrated and discussed above with reference to FIG. 5). In one embodiment, the term 'lowest' (or 'least') beta error refers to a beta error that is substantially equal to zero. In one embodiment, the step 804 comprises determining which reading, among the received sensor signals, is the most accurate (i.e. which sensor signal exhibits the lowest beta error). This may be achieved by comparing the received sensor signals to one another and selecting the sensor signal with the lowest beta error. The beta error of the received sensor signals may also be compared to a predetermined threshold in order to select the sensor signal with the lowest beta error.

Once the sensor signal with the lowest beta error has been determined, this sensor signal is used as a so-called 'primary' sensor signal. The detection unit 222 may use the measurement obtained from the primary sensor signal until a given point in time (also referred to herein as a 'transition point'), at which point the detection unit 222 transitions to a signal received from another sensor (e.g., for blade pitch angle feedback). In one embodiment, the transition point may be predetermined (also referred to herein as a 'fixed stop'). For example, when two sensors as in $212_A$, $212_B$ are used, the signal received from sensor $212_A$ may be identified as the primary sensor signal and used to cover the first half of the feedback device's axial travel. The signal received from the sensor $212_B$ may then be used to cover the second half of the feedback device's axial travel. In other words, the detection unit 222 switches from the signal from sensor $212_A$ to the signal received from sensor $212_B$ halfway during the axial translation of the feedback device 204. This may be useful to achieve fine pitch and reverse sensing using both sensors $212_A$, $212_B$.

In another embodiment, the transition point is not fixed but is dynamically determined by the detection unit 222. In this embodiment, the detection unit 222 may be configured to determine, continually and in real-time, the sensor signal with the lowest beta error (i.e. the primary sensor signal). Whenever a new primary sensor signal is found, the detection unit 222 switches from the current primary sensor signal to the new primary sensor signal. In other words, the detection unit 222 may be configured to use, at any given point in time, the sensor reading that is the most accurate. At the transition from the current to the new primary sensor signal, the detection unit 222 may compute the average between the sensor signal measurements (e.g., for speed sensing). For example, for a feedback device 204 configured for to move axially by about 1.1 inches, the detection unit 222 may identify the sensor signal received from sensor $212_A$ as the primary sensor signal over the beta position range from 0 inches to 0.4 inches. At a beta position of 0.4 inches, the detection unit 222 may determine that the sensor signal received from sensor $212_A$ exhibits lower beta error than the beta error exhibited by sensor signal received from sensor $212_B$. The detection unit 222 may thus identify the signal from sensor $212_B$ as the new primary sensor signal and switch from the current primary sensor signal (i.e. the signal from sensor $212_A$) to the signal from sensor $212_B$. The signal from sensor $212_B$ may then be used as the primary sensor signal for the remainder of the feedback device's axial translation (i.e. from 0.4 inches to 1.1 inches). In other words, the combined sensor signal illustratively comprises the sensor signal from sensor $212_A$ from 0 to 0.4 inches and the sensor signal from sensor $212_B$ from 0.4 to 1.1 inches. At the transition point (i.e. at the beta position of 0.4 inches), the detection unit 222 may compute the average of the sensor signal measurements in order to find the value of the combined sensor signal at the transition point.

At step 806, the combined sensor signal may then be used to generate feedback (e.g., in the form of a feedback signal) indicative of the blade pitch angle of the propeller blades. Operating parameter(s) (e.g., speed) of the engine and/or propeller (respectively references 110 and 130 in FIG. 1) may also be determined.

From the above it can be seen that, in one embodiment, as the feedback device 204 moves axially away from the sensor(s) 212 (in the direction of arrow B), the fact that the sensor(s) 212 are offset along the direction of axial travel of the feedback device 204 may make detection of the position markers 202 possible even when the axial position of the feedback device 204 is farthest away from the sensor(s) 212. Indeed, axially offsetting the sensor(s) 212 allows for the magnetic flux path to be extended as the feedback device 204 moves axially away from the sensor(s) 212. The magnetic path extension further increases the magnetic flux density at the edges $302_1$, $302_2$ of the feedback device 204, as the feedback device 204 moves axially along axis A. This increases the overall sensor signal and may in turn mitigate (i.e. reduce) edge-related effects, thereby allowing accurate detection of the position markers 202.

In one embodiment, each one of the one or more sensors 212 may have a single-channel configuration. Each sensor 212 may be implemented as a transducer comprising a single coil wound around a permanent magnet (not shown). The coil may be configured to generate the sensor signal in response to variations in the magnetic field caused by the movement of the position markers 202 by the sensor 212. In another embodiment, each sensor 212 may alternatively have a multi-channel configuration wherein sensor signals are acquired in a redundant manner. This may alleviate the need for having more than two sensors 212 to achieve redundancy, as discussed above. For example, in one embodiment, two sensors 212 may be provided with a first one of the sensors 212 having a single coil and one or more coils being added to the second sensor 212. In another embodiment, both sensors 212 may be provided with multiple coils (e.g., two or three). It should be understood that the multiple sensor coils may be provided for redundancy purposes. In one embodiment, separate sensor functions, such as control and protection, may exist (e.g., control and protection coils may be provided) in the same sensor 212. The coils may be spaced and electrically isolated from each another. The coils may be wound in a concentric manner around the permanent magnet. In some embodiment, the coils may be wound around the permanent magnet and disposed at different elevations along the sensor axis (e.g., axis $S_A$). The coils may be substantially identical (e.g., of substantially the same diameter and height along the sensor axis) or have different configurations. Each coil may be configured to generate one or more sensor signals on a given channel in response to variations in the magnetic field.

Figure 9:
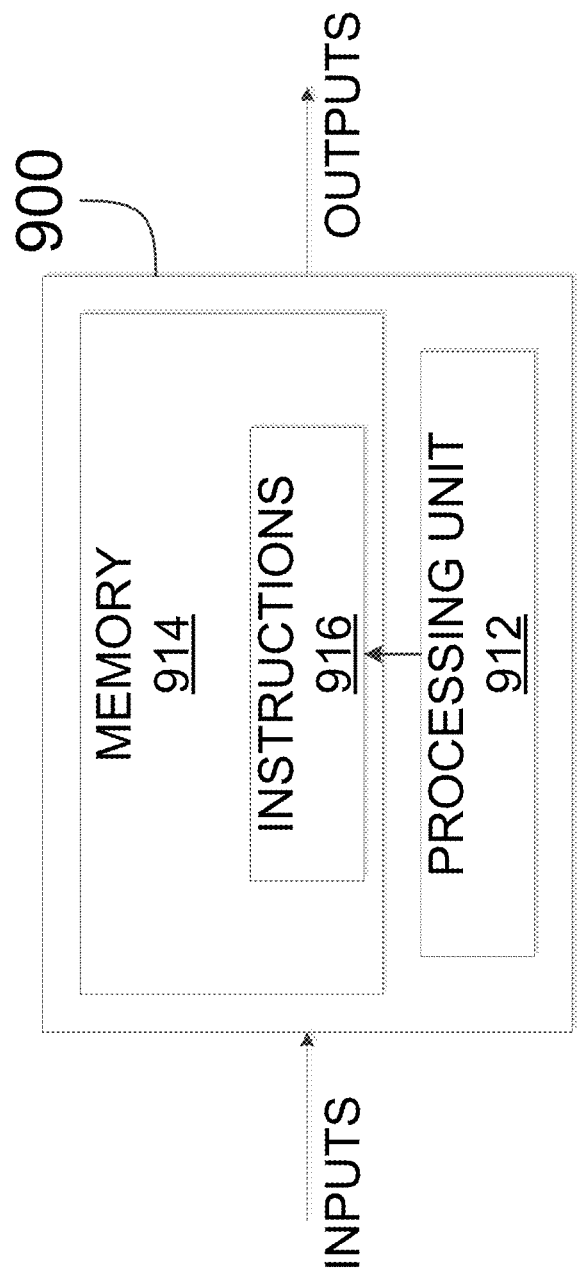
FIG. 9 is a block diagram of an example computing system for implementing the method of FIG. 8, in accordance with an embodiment.

With reference to FIG. 9, the method 800 may be implemented using a computing device 900 comprising a processing unit 912 and a memory 914 which has stored therein computer-executable instructions 916. The processing unit 912 may comprise any suitable devices configured to implement the system such that instructions 916, when executed by the computing device 900 or other programmable apparatus, may cause the functions/acts/steps of the method 800 as described herein to be executed. The processing unit 912 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 914 may comprise any suitable known or other machine-readable storage medium. The memory 914 may comprise non-transitory computer readable storage medium, for example, but not limited to, an electronic, magnetic, optical, electromagnetic, infrared, or semiconductor system, apparatus, or device, or any suitable combination of the foregoing. The memory 914 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 914 may comprise any storage means (e.g., devices) suitable for retrievably storing machine-readable instructions 916 executable by processing unit 912. In some embodiments, the computing device 900 can be implemented as part of a full-authority digital engine controls (FADEC) or other similar device, including electronic engine control (EEC), engine control unit (ECU), and the like.

The methods and systems described herein may be implemented in a high level procedural or object oriented programming or scripting language, or a combination thereof, to communicate with or assist in the operation of a computer system, for example the computing device 900. Alternatively, the methods and systems may be implemented in assembly or machine language. The language may be a compiled or interpreted language. Program code for implementing the methods and systems for detection may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems may also be considered to be implemented by way of a non-transitory computer-readable storage medium having a computer program stored thereon. The computer program may comprise computer-readable instructions which cause a computer, or in some embodiments the processing unit 912 of the computing device 900, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A blade angle feedback assembly for a rotor of an aircraft engine, the rotor rotatable about an axis and having rotor blades rotatable about respective spanwise axes to adjust a blade angle thereof, the blade angle feedback assembly comprising:
   a feedback device having a plurality of position markers disposed thereon, the feedback device comprising a root surface having a first edge and a second edge opposite the first edge, the plurality of position markers extending away from the root surface;
   a plurality of sensors each configured for producing a sensor signal in response to detecting a relative movement between the feedback device and the plurality of sensors, the plurality of sensors axially offset along the axis, the plurality of sensors comprising a first sensor positioned adjacent the first edge and at least one second sensor positioned adjacent the second edge; and
   a control unit communicatively coupled to the plurality of sensors and configured to generate a feedback signal indicative of the blade angle of the rotor blades in response to the sensor signals received from the plurality of sensors.

2. The blade angle feedback assembly of claim 1, wherein the first sensor comprises a first permanent magnet and at least one first coil wound around the first permanent magnet and the at least one second sensor comprises a second permanent magnet and at least one second coil wound around the second permanent magnet.

3. The blade angle feedback assembly of claim 1, wherein the control unit is further configured for:
   receiving a plurality of sensor signals from the plurality of sensors as the feedback device is moved along the axis;
   processing the plurality of sensor signals to generate a combined sensor signal having minimized reading error; and
   generating the feedback signal based on the combined sensor signal.

4. The blade angle feedback assembly of claim 3, wherein the processing the plurality of sensor signals comprises, at any given point in time, determining a given one of the plurality of sensor signals having minimized reading error, and wherein a reading from the combined sensor signal at the given point in time is set to correspond to a reading from the given sensor signal at the given point in time.

5. The blade angle feedback assembly of claim 3 or 4, wherein the processing the plurality of sensor signals comprises processing a first sensor signal and a second sensor signal by:
   setting the first sensor signal as a primary sensor signal; and
   at a predetermined point in time during axial travel of the feedback device, setting the second sensor signal as the primary sensor signal;
   wherein, before and after the predetermined point in time, a reading from the combined sensor signal is set to correspond to a reading from the primary sensor signal, and further wherein, at the predetermined point in time, a reading from the combined sensor signal is set to correspond to an average of readings from the first sensor signal and the second sensor signal.

6. The blade angle feedback assembly of claim 1, wherein the feedback device is coupled to rotate with the rotor and to move along the axis with adjustment of the blade angle.

7. The blade angle feedback assembly of claim 1, wherein the plurality of position markers and the plurality of sensors are circumferentially spaced around the feedback device.

8. A rotor system of an aircraft engine, the rotor system comprising:
   a rotor rotatable by a shaft about an axis, the rotor having rotor blades rotatable about respective spanwise axes to adjust a blade angle thereof;
   a feedback device having a plurality of position markers disposed thereon, the feedback device comprising a root surface having a first edge and a second edge opposite the first edge, the plurality of position markers extending away from the root surface; and
   a plurality of sensors each configured for producing a sensor signal in response to detecting a relative movement between the feedback device and the plurality of sensors, the plurality of sensors axially offset along the axis, and the plurality of sensors comprising a first sensor positioned adjacent the first edge and at least one second sensor positioned adjacent the second edge.

9. The rotor system of claim 8, wherein the first sensor comprises a first permanent magnet and at least one first coil wound around the first permanent magnet, and the at least one second sensor comprises a second permanent magnet and at least one second coil wound around the second permanent magnet.

10. The rotor system of claim 8, further comprising a control unit communicatively coupled to the plurality of sensors and configured for:
    receiving a plurality of sensor signals from the plurality of sensors as the feedback device is moved along the axis;
    processing the plurality of sensor signals to generate a combined sensor signal having minimized reading error; and
    generating, based on the combined sensor signal, a feedback signal indicative of the blade angle.

11. The rotor system of claim 10, wherein the control unit is configured for processing the plurality of sensor signals comprising, at any given point in time, determining a given one of the plurality of sensor signals having minimized reading error, and further wherein a reading from the combined sensor signal at the given point in time is set to correspond to a reading from the given sensor signal at the given point in time.

12. The rotor system of claim 10, wherein the control unit is configured for processing the plurality of sensor signals comprising processing a first sensor signal and a second sensor signal by:

setting the first sensor signal as a primary sensor signal; and at a predetermined point in time during axial travel of the feedback device, setting the second sensor signal as the primary sensor signal;

wherein, before and after the predetermined point in time, a reading from the combined sensor signal is set to correspond to a reading from the primary sensor signal, and further wherein, at the predetermined point in time, a reading from the combined sensor signal is set to correspond to an average of readings from the first sensor signal and the second sensor signal.

13. The rotor system of claim 8, wherein the feedback device is coupled to rotate with the rotor and to move along the axis with adjustment of the blade angle.

14. The rotor system of claim 8, wherein the plurality of position markers and the plurality of sensors are circumferentially spaced around the feedback device.

15. A method for providing blade angle feedback for a rotor of an aircraft engine, the rotor rotatable about an axis and having rotor blades rotatable about respective spanwise axes to adjust a blade angle thereof, the method comprising:

receiving a plurality of sensor signals from a plurality of sensors each configured for producing a sensor signal in response to detecting a relative movement between a feedback device having a plurality of position markers disposed thereon and the plurality of sensors, the feedback device comprising a root surface having a first edge and a second edge opposite the first edge, the plurality of position markers extending away from the root surface, the plurality of sensors axially offset along the axis, each sensor having associated therewith an optimal position range within which a reading error of the sensor is minimized, the plurality of sensors comprising a first sensor positioned adjacent the first edge and at least one second sensor positioned adjacent the second edge;

processing the plurality of sensor signals to generate a combined sensor signal having minimized reading error; and generating, based on the combined sensor signal, a feedback signal indicative of the blade angle.

16. The method of claim 15, wherein the processing the plurality of sensor signals comprises, at any given point in time, determining a given one of the plurality of sensor signals having minimized reading error, and further wherein a reading from the combined sensor signal at the given point in time is set to correspond to a reading from the given sensor signal at the given point in time.

17. The method of claim 15, wherein the processing the plurality of sensor signals comprises processing a first sensor signal and a second sensor signal by:

setting the first sensor signal as a primary sensor signal; and at a predetermined point in time during axial travel of the feedback device, setting the second sensor signal as the primary sensor signal;

wherein, before and after the predetermined point in time, a reading from the combined sensor signal is set to correspond to a reading from the primary sensor signal, and further wherein, at the predetermined point in time, a reading from the combined sensor signal is set to correspond to an average of readings from the first sensor signal and the second sensor signal.

18. The method of claim 15, wherein the feedback device is coupled to rotate with the rotor and to move along the axis with adjustment of the blade angle and the plurality of sensors are circumferentially spaced around the feedback device, and further wherein the sensor signals are received from the plurality of sensors in response to detecting, as the feedback device rotates about the axis, passage of the plurality of position markers, the plurality of position markers being circumferentially spaced around the feedback device.

* * * * *